UNITED STATES PATENT OFFICE.

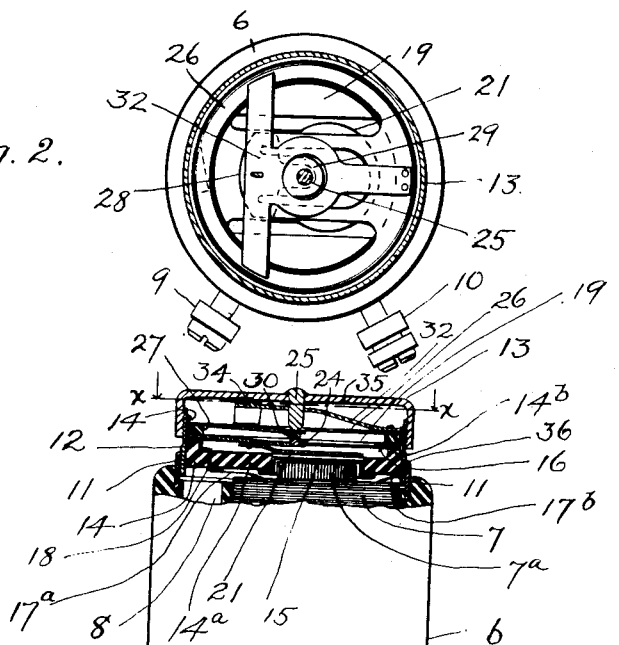
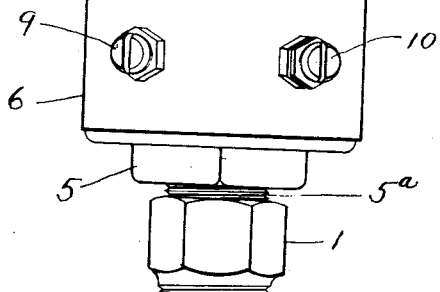
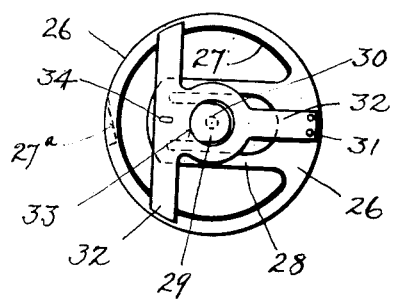
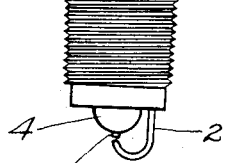
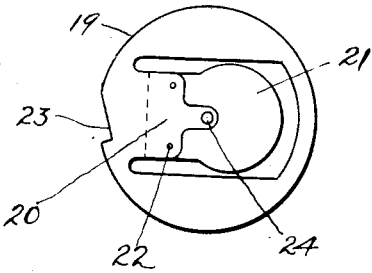

HENRY C. THOMSON, OF BOSTON, AND HAROLD N. MICHAELSEN, OF CANTON, MASSACHUSETTS, ASSIGNORS, BY MESNE ASSIGNMENTS, TO SAMSON ELECTRIC COMPANY, A CORPORATION OF MASSACHUSETTS.

VIBRATOR FOR INDUCTION-COILS.

1,216,379.  Specification of Letters Patent.  Patented Feb. 20, 1917.

Application filed February 10, 1914.  Serial No. 817,756.

*To all whom it may concern:*

Be it known that we, HENRY C. THOMSON and HAROLD N. MICHAELSEN, citizens, respectively, of the United States and of Norway, and residing, respectively, in Boston, in the county of Suffolk, State of Massachusetts, and in Canton, county of Norfolk, Massachusetts, have invented a certain new and useful Improvement in Vibrators for Induction-Coils, of which the following is a specification, reference being had therein to the accompanying drawings.

Our invention has to do with circuit interrupters or vibrators which are designed to be operatively combined with a coil of wire wound around a core, as an induction coil, in relation permitting the magnetization of the core of the coil to operate the circuit interrupter.

Our invention relates in one of its features to an improved form of vibrator embodying certain novel features of construction which permit it to be associated in operative relation with the coil in an especially simple and compact structure, having its parts easily accessible for inspection or replacement, and readily adjustable during operation. While by reason of its structure the vibrator is particularly suitable for use upon, and is described in connection with the type of spark producing apparatus commonly known as igniters, and in which the spark plug carrying the spark points serves to support a shell or casing in which is carried induction coil and the vibrator, it is equally adapted for use in electric apparatus of many other types in which a core rendered magnetizable by a coil of wire around the same, serves to actuate the circuit interrupter.

Furthermore, a vibrator constructed in accordance with our invention is peculiarly adapted for use in connection with igniters in which the casing carrying the induction coil is formed of material which is preferably molded into shape while plastic, and in one of the features of our invention has particularly to do with the manner of securing our vibrator upon the casing and in operative relation with respect to the core. In securing this result we have devised our vibrator with a structure particularly arranged for coöperation with an element preferably forming a permanent part of the casing, whereby the attachment of the vibrator upon the casing may be made in durable and effective manner, and preferably by a fused metal joint, as hereinafter described. Moreover our vibrator is of such structure as to permit the easy removal of its parts for inspection or replacement, while also embodying such details of construction, as not only to insure an effective protection of the interior working part of the vibrator from external dust or moisture, and to afford a capacity for the adjustment of the vibrator points from the outside without exposing the interior of the vibrator, but also to render such adjustment possible without materially impairing the efficiency of the protection afforded.

To these ends and objects our invention consists in the construction, and in the combination of parts, substantially as hereinafter described and claimed.

In the accompanying drawing Figure 1 is an elevation, partly in section, of an igniter embodying our invention in its preferred form. Fig. 2 is a plan view of the same on the plane, $x$—$x$, in Fig. 1. Fig. 3 is a plan view of the upper contact piece carrying the stationary vibrator point. Fig. 4 is a plan view of the lower contact piece carrying the vibrating armature and the moving vibrator point.

Referring to the drawings, 1 represents the spark plug shell having mounted thereon a spark point, 2. A second spark point 3 is carried by a porcelain core 4, secured within the spark plug shell 1, by means of the spark plug head nut 5 in the usual manner. Said spark plug head nut 5 is preferably formed of a metal piece having a threaded neck 5ª adapted to engage a correspondingly threaded seat in the spark plug shell 1.

The casing 6 is preferably composed of insulating material molded or pressed into shape while such material is still in a plastic condition. The upper portion of the head nut 5 is embedded in the base of the casing when the same is plastic, and thereby secures the head nut upon the casing in a permanent and effective manner.

The casing 6 in its preferred form, is of a substantially cylindrical form, and is provided preferably with two interior recesses extending longitudinally of the same. Within one of such recesses is located the induction coil 7; a condenser (not shown in the drawings) being furthermore preferably located in the other recess 8. The binding posts 9 and 10 lead to the primary terminals of said induction coil. One of the secondary terminals of said coil is in connection with the spark point 2 while the other terminal is in connection with the spark point 3; which connections may be readily made in a manner understood by one familiar in the art without further explanation.

For the purpose of sealing the induction coil, and the condenser, within the interior of the casing, and of attaching the vibrator, we have devised the following construction. A metal tube or ring 11 is embedded in the upper end of the casing while the material forming the same is in a plastic condition, so as to permanently incorporate said ring with said casing as an inseparable portion of the same. Said casing ring 11 is of relatively short length but should be long enough to extend into the casing to a depth sufficient to insure a thoroughly permanent and leakage-proof connection with the casing.

The vibrator is integrally distinct as a structure, the parts of said vibrator being assembled in operative relation within a metal shell or tube 12 of relatively short length, adapted to fit closely within said first ring. Said parts are retained in their assembled relation through a cap 13 adapted to engage with upper end of the said shell 12 by a preferably threaded connection. The construction of said vibrator and arrangement of said operative parts is as follows. The lower end of said shell 12 is closed by a partition or base composed of and preferably integral with the insulated filling 14 which is adapted to line the shell 12 for substantially its entire length. Said filling 14 embodies a partition or base 14ª completely closing the lower end of said shell 12 except for an aperture located directly over the core 7ª of the induction coil, which aperture in turn is closed by a thin metal cup 15 sealed within such aperture so as to permit the end of the core 7ª to extend well up toward the upper surface of said wall 14ª. By such construction the bottom or lower end of said shell 12 is effectively sealed in a permanent manner.

Slightly above said base 14ª said filling presents a shoulder 14ᵇ which is topped by a thin metallic washer 16. Said washer 16 is in electrical connection with one terminal 17ª of an interrupted portion of the primary circuit of the coil by means of a metallic strip 18. The other terminal 17ᵇ of said interrupted circuit is connected with the shell 12 as by grounding therewith. On said washer 16 is supported, transversely across said shell 12, the lower contact spring 19 carrying the armature or moving part of the vibrator. Said spring 19 is preferably from a disk of resilient sheet metal, cut away to leave a marginal portion of substantially circular outline which is adapted to rest upon said washer 16, and having projecting from said marginal portion at one side a flexible portion, or tongue 20 extending in the direction of the center, as shown. To the tongue 20 is attached the vibrator armature 21, secured thereto as by the rivets 22, and preferably slightly offset therefrom, as shown, so as to lie in a plane more nearly adjacent the upper surface of the cup 15, than does the spring 19.

Preferably, as more clearly shown in Fig. 1, the recess containing the induction coil is located in the casing eccentrically with respect to the ring 11, and in consequence the core of the coil lies eccentrically with respect to the shell 12 and at one side of the center of the marginal portion of the contact spring 19. It is desirable to take advantage of this fact by forming the spring 19, so that the tongue 20 extends from said marginal portion at its point of maximum removal from said core, as thereby a tongue of the greatest length and flexibility can be secured.

The armature 21 is carried in said tongue 20 so as to be located substantially centrally with respect to the core 7ª of the induction coil. For the purpose of automatically effecting the location of the circular contact spring 19 in a position to aline the armature 21 correctly over to the coil core, a notch 23 is provided which fits over a correspondingly formed projection embodied in the filling 14.

Upon the tongue 20 is also carried the lower contact point 24 which constitutes the movable vibrator point; the same being preferably located substantially in the center of the disk, as shown, and in axial alinement with a center pin 25 which projects from the center of the lower surface of the cap 13 for the purpose hereinafter set forth. Said contact-point 24 is in electric connection with the terminal 17ª through the contact spring 19, the washer 16 on which said spring 19 rests, and the strip 18 connecting said washer 16 with the terminal 17ª.

Above the lower contact spring 19 is situated the upper contact spring 26 which is also a sheet metal disk, cut away as hereinafter described, and is separated from the lower contact spring 19 by an insulated washer 27, which is preferably permanently attached to said upper contact spring. The upper contact spring 26 carries the upper contact point 30, which although held stationary in position with respect to the lower contact point 24, is carried upon the lower contact spring in such manner as to have a capacity for displacement from the plane of said disk, so as to permit a slight change in the longitudinal position of the same, with respect to the shell 12. This capacity is provided for by the following construction. Said upper contact spring 26 is of sheet metal material of a resilient character and as more clearly shown in Fig. 3, embodies a marginal portion of circular outline having extending partially across the same a spring strip 28, from the end of which extends in a reverse direction, a leveling tongue 29 carrying on the lower surface of its tip the stationary vibrator point 30, in such position as to locate the same in alinement with the vibrator point 24 carried on the lower contact spring, and with the center pin 25. Preferably a notch 27$^a$ is provided in the washer 27 which is adapted to fit over the projection formed on the filling 14 and hereinafter referred to as serving, by its engagement with the notch 23, to locate the lower contact spring 19 in its correct position; such projection also serving in similar manner to locate the upper contact spring 26 in its desired position.

Above the upper contact spring 26 is located a resilient member, preferably in the form of a T-shaped member 32 having the end of its upright or stem portion preferably secured to said piece 26, as by rivets 31. The free ends of the head or cross portion of said T-shaped member are adapted to rest upon the surface of the ring portion of the contact spring 26. The stem and head portion of said T-shaped piece are so bent as to cause said piece to be normally sprung away from said contact spring 26. The stem of said T-shaped member, near its point of connection to said head portion, is enlarged and a central aperture 33, is formed in such enlargement to permit the center pin 25 to project therethrough. On the upper surface of said T-shaped member is preferably provided a projection 34 which, through the resiliency of said T-shaped portion is caused to forcibly bear against the lower surface of said cap 13, and by its friction prevents the said cap from turning. If desired a series of radially extending indentations 35 may be provided in central arrangement on the lower surface of said cap 13 around said pin 25, and adapted to be engaged by said projection 34; thus more effectively locking said cap against rotation with respect to the shell 12.

The length of the center pin 25, the length of the vibrator points, and the position in which the vibrator points is supported above the disk 14$^a$ are so correlated that in the normal position of the vibrator cap 13, said pin 25 depresses the vibrator point 30, carried on the leveling tongue 29 of the upper contact spring 26, sufficiently to insure the contact of the same with the vibrator point 24 carried on the tongue 22 of the lower contact spring 19.

The shell 12 having the vibrator parts carried thereby and arranged therein in the manner hereinabove described, is slipped within the casing ring 11 and a solder joint 36 is run along the line of meeting between the same. Such solder not only serves to attach the shell 12 to the ring 11 in a secure manner, but also operating to seal the joint between the same in a thoroughly effective and permanent manner. Further the interengaging threads of the said cap 13 and the shell 12 should be made of a length, pitch, and closeness of fit sufficient, when smeared with grease or other suitable substance, to render such threaded joint entirely water tight.

In an igniter constructed as above set forth it will be evident that the vibrator points are intercalated in the primary circuit of the induction coil. The resiliency of the spring tongue 22 is such that as the core 7$^a$ of the coil becomes magnetized, it attracts the armature 21 and withdraws the movable vibrator point 24 from contact with the fixed vibrator point 30 located on the upper contact spring 26 and the vibrator will operate in the well known manner to make and break the primary circuit.

Where through wear or other cause any readjustment in the position of the vibrator points is desirable, such readjustment may be easily effected by simply rotating the cap 13 in one or the other direction. Such rotation screws the cap farther on to the tube 12 or unscrews it therefrom, thereby effecting a change in the longitudinal position of the end of the pin 25 with respect to the shell 12 and such change of position of the pin 25 will force the tongue 29, with the stationary vibrator point 30 carried thereon, into a lowered position and into firmer engagement with the moving vibrator point 24, or, by relieving the pressure on such vibrator point 30, will permit the resiliency of said tongue 29 to restore said point to a slightly raised position and secure a lighter engagement between the said points. The said cap will be retained or locked in its new position of adjustment by the pressure of the projection 33 on the T-shaped member 32 upon the lower or inner surface of said cap 13, or by its lodging in an indentation 35.

In consequence of our improved construction as hereinbefore described our igniter is completely water-proof and may be operated for an indefinite period while entirely submerged in water. Even the adjustment of the vibrator may be effected when the igniter is submerged without impairing the operation of the same. In consequence our igniter is particularly reliable for ignition service when applied in situations especially subject to dampness or exposed to wet weather conditions.

We claim as our invention:—

1. In ignition apparatus, a coil-containing casing having an open-ended recess formed therein, an induction coil located in said recess, a projecting edge carried upon said casing, and surrounding the open-end of said recess, an integrally distinct vibrator comprising a vibrator inclosing member engaging said projecting edge in a moisture proof relation, said vibrator inclosing member having its end adjacent the casing sealed against moisture, and having the parts of the vibrator assembled in operative relation outside said sealed end.

2. In ignition apparatus, a coil-containing casing having an open-ended recess formed therein, an induction coil located in said recess, a projecting member set into the casing around the open end of said recess, an integrally distinct vibrator comprising a vibrator inclosing member engaging said projecting member in a moisture proof relation, said vibrator inclosing member having its end adjacent the casing sealed against moisture and having the parts of the vibrator assembled in operative relation outside said sealed end.

3. In ignition apparatus, a coil containing casing formed of solidified plastic material having an open-ended recess formed therein, an induction coil located within said recess, a metallic ring embedded in the material of said casing and having a portion projecting from said casing and surrounding the open end of said recess, a vibrator comprising a shell provided with a partition hermetically sealing the bottom of the same and having the movable parts of the vibrator assembled in their operative relation within said shell and above said partition, and a continuous band of fused metal uniting said shell and said ring and securing the same together with a moisture proof joint.

4. In ignition apparatus, a coil-containing casing formed of solidified material molded while plastic and having an open-ended recess formed therein, an induction coil located in said recess, a cylindrical member surrounding the open end of said recess and permanently embedded in the material forming said casing, an integrally distinct vibrator comprising a vibrator inclosing shell engaging said cylindrical member in a moisture proof relation, said vibrator inclosing member having a partition wall sealing the lower end of the same and having the parts of the vibrator assembled in operative relation in the upper portion thereof.

5. In ignition apparatus, a coil-containing casing having an open-ended recess formed therein, an induction coil located in said recess and provided with a core, a cylindrical member secured to the casing around the open end of said recess, an integrally distinct vibrator comprising a vibrator inclosing shell engaging said cylindrical member in a moisture proof relation, said vibrator inclosing member having a partition sealing the lower end of the same and having the parts of the vibrator operatively assembled therein on the outer side of said partition in a position to be actuated by the magnetization of said core.

6. In combination with a coil having a core and provided with a tubular shell fixed with respect to the coil and surrounding the end of said core, an interrupter comprising one contact spring embodying a flexible portion carrying an armature and a movable contact point, a second contact spring having a second contact point mounted thereon with a capacity for a change in its longitudinal position with respect to said shell, said contact springs lying within said shell and transversely with respect to the same, and being mechanically unattached thereto and capable of manual removal therefrom, and a cap engaging said shell, said cap serving to control the longitudinal position of said upper contact point with respect to said shell through a portion projecting from said cap and engaging said contact spring, said cap also serving to secure said contact springs in their assembled relation within said shell.

7. In combination with a casing having an open ended recess formed therein, said recess having located therein a coil having a core, a shell fixed in respect to said casing around the open end of said recess and inclosing the end of said core, an interrupter comprising a lower contact spring embodying a flexible portion carrying an armature and having a movable contact point mounted thereon, an upper contact spring positioned within said shell adjacent and in an insulated relation with respect to said lower contact spring, said upper contact spring carrying an upper contact point mounted thereon in a contact making relation with said lower contact point and with a capacity for a change in its longitudinal position with respect to said shell, said contact springs lying transversely across said shell and being mechanically unattached thereto so as to be capable of free manual removal therefrom, the cap in threaded engagement with said shell and adjustable in longitudinal position thereon, said cap serving to secure said contact spring in their assembled relations within the shell, and to control the longitudinal position of said upper contact point with respect to said shell through a projection carried on said cap and bearing upon said upper contact spring.

8. The combination with a coil having a core and a shell fixed with respect to said coil and located adjacent the end of said core, of an interrupter comprising a lower contact spring having a marginal portion supported transversely with respect to said shell, and a tongue portion extending from said marginal portion, said tongue portion carrying a lower contact point and supporting an armature in proximity to said core end, an upper contact spring embodying a marginal portion located within said shell and lying transversely across the same above said lower contact spring and in insulated relation with respect to the same, said upper contact spring having a tongue portion with a capacity for displacement from the plane of said marginal portion and having an upper contact point mounted thereon in registration with said lower contact point, a cap in threaded engagement with said shell and adjustable in longitudinal position thereon, said cap serving to control the longitudinal position of said upper contact point with respect to said shell, through a stud fixed to said cap, and bearing upon said upper contact spring.

9. In combination with a casing having an open-ended recess formed therein, said recess having located therein a coil having a core, a ring set in said casing around the open end of said recess, a shell secured to said ring and inclosing the coil of said core, an interrupter comprising a lower contact spring having a marginal portion of circular outline supported transversely with respect to said shell, and a tongue portion extending from said marginal portion, said tongue portion carrying a lower contact point and supporting an armature in proximity to said core end, an upper contact spring embodying a marginal portion of circular outline located within said shell and lying transversely across the same above said lower contact spring and in insulated relation with respect to the same, said upper contact spring having a tongue portion with a capacity for displacement from the plane of said marginal portion and having an upper contact point mounted thereon in registration with said lower contact point, a cap in threaded engagement with said shell and adjustable in longitudinal position thereon, said cap serving to control the longitudinal position of said upper contact point with respect to said shell, through an axial stud fixed to said cap, and bearing upon said upper contact spring.

10. In combination with a casing having an open-ended recess formed therein, said recess having located therein a coil having a core, a shell fixed with respect to said casing around the open end of said recess and inclosing the end of the core, an interrupter comprising a lower contact spring lying transversely across said shell, said spring embodying a flexible portion carrying an armature and having a movable contact point mounted thereon, an upper contact spring positioned within said shell and carrying an upper contact point mounted thereon in alinement with said lower contact point with a capacity for a change in its longitudinal position with respect to said shell, a cap in threaded engagement with said shell and adjustable in longitudinal position thereon, said cap serving to control the longitudinal position of said upper contact point with respect to said shell, through an axial stud fixed to said cap, and bearing upon said upper contact spring, and a resilient member interposed between said cap and said upper contact spring and normally held between the same in a state of distortion and serving to secure the upper and lower contact springs in their assembled relation.

11. In combination with a casing having an open-ended recess formed therein, said recess having located therein a coil having a core, a shell fixed with respect to said casing around the open end of said recess and inclosing the end of the core, an interrupter comprising a lower contact spring lying transversely across said shell, said spring embodying a flexible portion carrying an armature, and having a movable contact point mounted thereon, an upper contact spring positioned within said shell and carrying an upper contact point located thereon in registration with said lower contact point and with a capacity for change in its longitudinal position with respect to said shell, a cap in threaded engagement with said shell and adjustable in longitudinal position thereon, said cap serving to control the longitudinal position of said upper contact point with respect to said shell through an axial stud fixed to said cap and bearing upon said upper contact spring, a resilient member forming a part of said upper contact spring and normally held in a state of distortion between said cap and said spring whereby the contact springs of the interrupter are held in their assembled relation.

12. In combination with a casing having an open-ended recess formed therein, said recess having located therein a coil having a core, a shell fixed with respect to said casing around the open end of said recess and inclosing the end of the core, an interrupter comprising a lower contact spring lying transversely across said shell, said spring embodying a flexible portion carrying an armature, and having a movable contact point mounted thereon, an upper contact spring positioned within said shell and carrying an upper contact point thereon in registration with said lower contact point and with a capacity for change in its longitudinal position with respect to said shell, said upper contact spring and said shell embodying means for locking upper contact spring against axial rotation with respect to said shell, a cap in threaded engagement with said shell and adjustable in longitudinal position thereon, said cap serving to control the longitudinal position of said upper contact point with respect to said shell through an axial stud fixed to said cap and bearing upon said upper contact spring, a locking spring interposed between said upper contact spring and said cap and said spring, said locking spring being non-rotatable with respect to said ring and being provided with means adapted to engage coöperating means provided on said cap whereby said cap may be locked against rotation with respect to said ring.

13. In combination with a casing having an open ended recess formed therein, said recess having located therein a coil having a core, a shell fixed with respect to said casing and inclosing the end of said core, said shell being located eccentrically with respect to said core end, an interrupter comprising a lower contact spring having a marginal portion supported transversely with respect to said shell and a tongue extending from said marginal portion at its point of maximum removal from said core, and extending in the direction of said core, said tongue portion carrying a lower contact point located concentrically with respect to said marginal portion and carrying an armature in proximity to said core end, an upper contact spring positioned within said shell and carrying an upper contact point located thereon concentrically with respect to said shell and in registration with said lower contact point and having a capacity for change in its longitudinal position with respect to said shell, both said contact springs lying transversely with respect to said shells and being mechanically unattached thereto so as to be capable of free manual removal therefrom, a cap in threaded engagement with said shell and adjustable in longitudinal position thereon, said cap serving to secure said contact springs in their assembled relation within said shell and to control the longitudinal position of said upper contact point with respect to said shell through a stud portion projecting from said cap and adapted to bear against said upper contact spring.

In testimony whereof we affix our signatures, in presence of two witnesses.

HENRY C. THOMSON.
HAROLD N. MICHAELSEN.

Witnesses:
NATHAN B. DAY,
CHAS. F. RANDALL.